United States Patent
Kwon et al.

(10) Patent No.: US 10,323,726 B2
(45) Date of Patent: Jun. 18, 2019

(54) PLANETARY GEAR TRAIN OF AUTOMATIC TRANSMISSION FOR VEHICLES

(71) Applicants: Hyundai Motor Company, Seoul (KR); Kia Motors Corporation, Seoul (KR)

(72) Inventors: Hyun Sik Kwon, Seoul (KR); Seong Wook Hwang, Gunpo-si (KR); Ki Tae Kim, Incheon (KR); Wonmin Cho, Hwaseong-si (KR); Jae Chang Kook, Hwaseong-si (KR); Seongwook Ji, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/823,156

(22) Filed: Nov. 27, 2017

(65) Prior Publication Data
US 2019/0085947 A1 Mar. 21, 2019

(30) Foreign Application Priority Data
Sep. 20, 2017 (KR) .......................... 10-2017-0121371

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
CPC ..... F16H 1/28; F16H 3/44; F16H 3/00; F16H 2200/2012; F16H 2200/2035
See application file for complete search history.

(56) References Cited

U.S. PATENT DOCUMENTS 9,927,008 B1 * 3/2018 Burchett .................. F16H 3/66

* cited by examiner

*Primary Examiner* — Mark J Beauchaine
(74) *Attorney, Agent, or Firm* — Slater Matsil, LLP

(57) ABSTRACT

A planetary gear train includes an input shaft and an output shaft. A first planetary gear set has first, second, and third rotational elements. A second planetary gear set has fourth, fifth, and sixth rotational elements. A third planetary gear set has seventh, eighth, and ninth rotational elements. A fourth planetary gear set has tenth, eleventh, and twelfth rotational elements. A first shaft is fixedly connected with the twelfth rotational element and fixedly connected with the input shaft. A second shaft is fixedly connected with the fifth rotational element and the eighth rotational element, and fixedly connected with the output shaft. A third shaft is fixedly connected with the fourth rotational element. A fourth shaft is fixedly connected with the seventh rotational element. A fifth shaft is fixedly connected with the sixth rotational element and the ninth rotational element.

20 Claims, 5 Drawing Sheets

FIG. 2

| Shift-stage | Control element | | | | | | Gear ratio |
|---|---|---|---|---|---|---|---|
| | C1 | C2 | C3 | C4 | B1 | B2 | |
| D1 | ● | | | ● | | ● | 5.453 |
| D2 | | ● | | ● | | ● | 3.259 |
| D3 | | | ● | ● | | ● | 2.968 |
| D4 | ● | ● | ● | | | ● | 2.450 |
| D5 | ● | | ● | | | ● | 1.988 |
| D6 | ● | ● | | | | ● | 1.522 |
| D7 | ● | ● | ● | | | | 1.000 |
| D8 | ● | ● | | | ● | | 0.640 |
| D9 | ● | | ● | | ● | | 0.319 |
| REV | ● | | | ● | ● | | -2.071 |

A planetary gear train according to an exemplary embodiment of the present invention includes an input shaft for receiving an engine torque. An output shaft delivers a torque to an output gear. A first planetary gear set has first, second, and third rotational elements and a second planetary gear set has fourth, fifth, and sixth rotational elements. A third planetary gear set has seventh, eighth, and ninth rotational elements and a fourth planetary gear set has tenth, eleventh, and twelfth rotational elements. A first shaft is fixedly connected with the twelfth rotational element and fixedly connected with the input shaft. A second shaft is fixedly connected with the fifth rotational element and the eighth rotational element, and fixedly connected with the output shaft. A third shaft fixedly is connected with the fourth rotational element. A fourth shaft is fixedly connected with the seventh rotational element. A fifth shaft is fixedly connected with the sixth rotational element and the ninth rotational element. A sixth shaft is fixedly connected with the tenth rotational element. Each of a plurality of shafts is selectively connected to the transmission housing and fixedly connected to a rotation element of the first and fourth planetary gear sets that is not fixedly connected with any of the first to six shafts.

PLANETARY GEAR TRAIN OF AUTOMATIC TRANSMISSION FOR VEHICLES

CROSS-REFERENCE TO RELATED APPLICATIONS

This application claims priority to Korean Patent Application No. 10-2017-0121371, filed in the Korean Intellectual Property Office on Sep. 20, 2017, which application is hereby incorporated herein by reference.

TECHNICAL FIELD

The present invention relates to an automatic transmission for a vehicle.

BACKGROUND

Generally, in automatic transmission field, achieving more shift stages is a technology for maximizing fuel consumption and driving efficiency and has been researched, and recent increases in oil prices are triggering hard competition in enhancing fuel consumption of a vehicle.

In this sense, research on an engine has been undertaken to achieve weight reduction and to enhance fuel consumption by so-called downsizing, and research on an automatic transmission has been performed to simultaneously provide better drivability and fuel consumption by achieving more shift stages.

In order to achieve more shift stages for an automatic transmission, the number of parts, particularly the number of planetary gear sets is typically increased and installability, production cost, weight, and power flow efficiency according to total length of transmission is increased.

Therefore, in order to maximally enhance fuel consumption of an automatic transmission having more shift stages, it is important for better efficiency to be derived by a smaller number of parts.

In this respect, an eight-speed automatic transmission has been recently introduced, and a planetary gear train for an automatic transmission enabling more shift stages is continuously required.

However, the majority of general automatic transmissions having more than eight speeds include three to four planetary gear sets and five to seven control elements (friction element), in this case, total length is increased, which has drawbacks of deteriorating installability.

As a result, plural rows structure which planetary gear sets are on planetary gear sets has been adopted, or a dog clutch is applied in place of wet control elements. However, in this case, applicable structure is restricted and shift feel is deteriorated by applying the dog clutch.

The above information disclosed in this Background section is only for enhancement of understanding of the background of the invention and therefore it may contain information that does not form the prior art that is already known in this country to a person of ordinary skill in the art.

SUMMARY

Embodiments of the present invention relate to an automatic transmission for a vehicle. Particular embodiments relate to a planetary gear train of an automatic transmission for a vehicle having advantages of, by minimal complexity, realizing nine forward speeds, thereby improving power delivery performance and fuel consumption due to multi-stages, and improving driving stability of a vehicle by utilizing a low rotation speed of an engine.

Embodiments of the present invention provide a planetary gear train of an automatic transmission for a vehicle having advantages of obtaining shift-stages of the forward nine speeds by minimal number of parts, improving power delivery performance and fuel consumption by multi-stages of an automatic transmission, and improving driving stability of a vehicle by utilizing a low rotation speed of an engine.

Here, the plurality of shafts comprise a seventh shaft fixedly connected with the first rotational element and the eleventh rotational element, and selectively connected with the transmission housing; and an eighth shaft fixedly connected with the third rotational element, and selectively connected with the transmission housing. The input shaft is selectively connected with the first shaft, the input shaft is selectively connected with the second shaft. The fifth shaft is selectively connected with the seventh shaft, and the third shaft is selectively connected with the fifth shaft.

The planetary gear train further includes four clutches selectively connecting two shafts among the first to the eighth shaft, and two brakes selectively connecting the seventh shaft and the eighth shaft to the transmission housing, respectively.

At this time, the four clutches include a first clutch disposed between the first shaft and the fifth shaft, a second clutch disposed between the fourth shaft and the seventh shaft, a third clutch disposed between the fourth shaft and the sixth shaft, and a fourth clutch disposed between the third shaft and the sixth shaft, the two brake include a first brake disposed between the seventh shaft and the transmission housing; and a second brake disposed between the eighth shaft and the transmission housing.

Further, the first planetary gear set is a single pinion planetary gear set, and the first, second, and third rotational elements are respectively a first sun gear, a first planetary carrier, and a first ring gear, the second planetary gear set is a single pinion planetary gear set, and the fourth, fifth, and sixth rotational elements are respectively a second sun gear, a second planetary carrier, and a second ring gear, the third planetary gear set is a single pinion planetary gear set, and the seventh, eighth, and ninth rotational elements are respectively a third sun gear, a third planetary carrier, and a third ring gear, and the fourth planetary gear set is a single pinion planetary gear set, and the tenth, eleventh, and twelfth rotational elements are respectively a fourth sun gear, a fourth planetary carrier, and a fourth ring gear.

Further, the second and third planetary gear set are compound planetary gear sets which the fourth rotational element is the second sun gear, the fifth and the eighth rotational elements are sharing planetary carriers, the sixth and ninth rotational elements are sharing ring gears, the seventh rotational element is the third sun gear.

Further, the output gear is disposed in front of the first planetary gear set.

A planetary gear train of an automatic transmission for a vehicle according to an exemplary embodiment of the present invention, shift-stages of forward nine speeds and one reverse speed may be realized by combination of four planetary gear sets of simple planetary gear sets and six control elements.

Further, a planetary gear train according to an exemplary embodiment of the present invention may realize shift stages appropriate for rotation speed of an engine due to multi-stages of an automatic transmission and improve driving stability of a vehicle by utilizing a low rotation speed of an engine.

Further, a planetary gear train according to an exemplary embodiment of the present invention maximize engine driving efficiency by multi-stages of an automatic transmission, and may improve power delivery performance and fuel consumption.

Further, effects that can be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

FIG. 2 is an operational chart for respective control elements at respective shift stages in a planetary gear train according to a first exemplary embodiment of the present invention.

DETAILED DESCRIPTION OF ILLUSTRATIVE EMBODIMENTS

Figure 1:
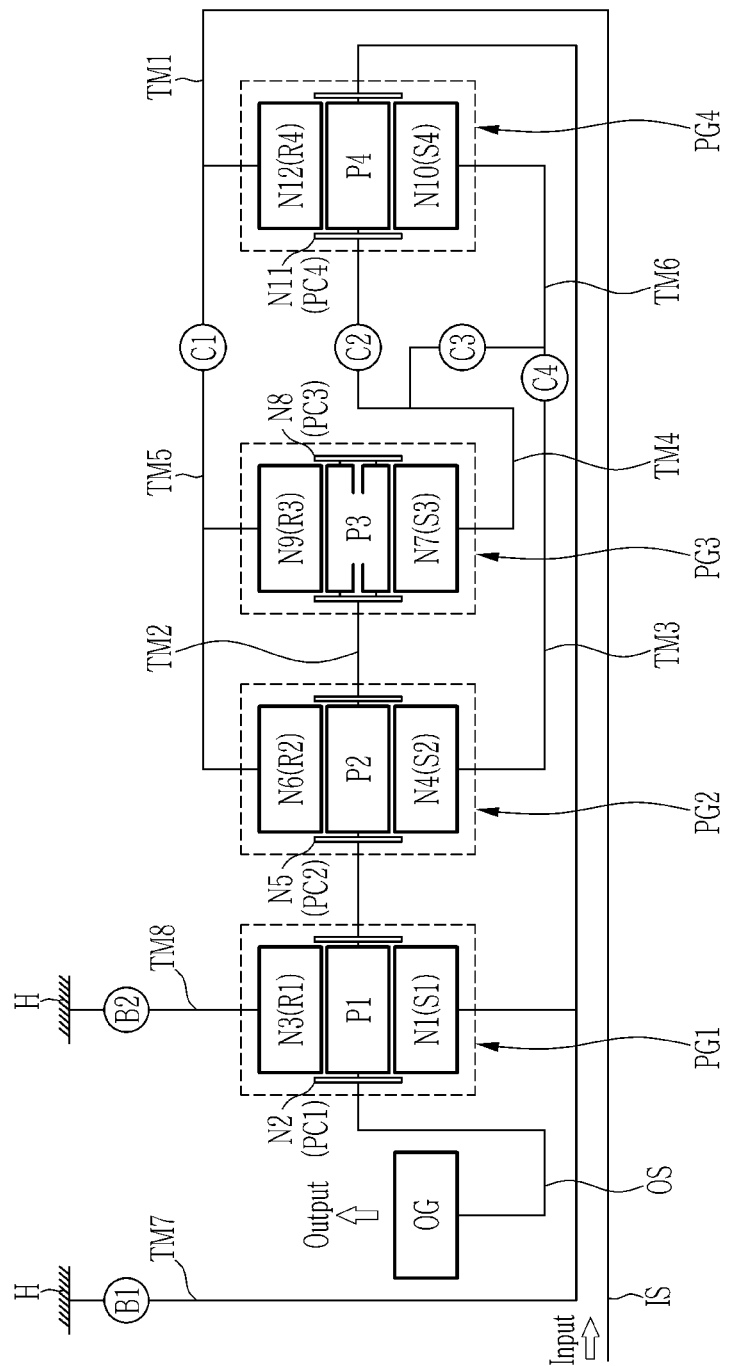
FIG. 1 is a schematic diagram of a planetary gear train according to a first exemplary embodiment of the present invention.

Hereinafter, an exemplary embodiment of the present invention will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to a first exemplary embodiment of the present invention.

Referring to FIG. 1, a planetary gear train according to a first exemplary embodiment of the present invention includes first, second, third, and fourth planetary gear sets PG1, PG2, PG3, and PG4 arranged on a same axis, an input shaft IS, an output shaft OS, eight shafts TM1 to TM8 connected with rotational elements of the first, second, third, and fourth planetary gear sets PG1, PG2, PG3, and PG4, four clutches C1 to C4 and two brakes B1 and B2 as control elements, and a transmission housing H.

Torque input from the input shaft IS is shifted by cooperative operation of the first, second, third, and fourth planetary gear sets PG1, PG2, PG3, and PG4, and then output through the output shaft OS.

In an exemplary embodiment of the present invention, the planetary gear sets are arranged in the order of first, second, third and fourth planetary gear sets PG1, PG2, PG3 and PG4, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus which is not illustrated.

The first planetary gear set PG1 is a single pinion planetary gear set, and includes a first sun gear S1, a first planet carrier PC1 that supports a plurality of first pinion gear P1 externally engaged with the first sun gear S1 so that the first pinion gear P1 may rotate and revolve, and a first ring gear R1 internally engaged and torque-connected with a plurality of the first pinion gear P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that supports a plurality of second pinion gear P2 externally engaged with the second sun gear S2 so that the second pinion gear P2 may rotate and revolve, and a second ring gear R2 internally engaged and torque-connected with a plurality of the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports a plurality of a third pinion gear P3 externally engaged with the third sun gear S3 so that the third pinion gear P3 may rotate and revolve, and a third ring gear R3 internally engaged and torque-connected with a plurality of the third pinion P3. The third sun gear S3 acts as a seventh rotational element N7, the third planet carrier PC3 acts as a eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports a fourth pinion P4 externally engaged with the fourth sun gear S4, and a fourth ring gear R4 internally engaged with the fourth pinion P4. The fourth sun gear S4 acts as a tenth rotational element N10, the fourth planet carrier PC4 acts as an eleventh rotational element N11, and the fourth ring gear R4 acts as a twelfth rotational element N12.

In the arrangement of the first, second, third, and fourth planetary gear sets PG1, PG2, PG3, and PG4, the first rotational element N1 is fixedly connected with the eleventh rotational element N11, the second rotational element N2 is fixedly connected with the fifth rotational element N5 and the eighth rotational element N8, and the sixth rotational element N6 is fixedly connected with the ninth rotational element N9 by eight shafts TM1 to TM8.

The eight shafts TM1 to TM8 are arranged as follows.

The first shaft TM1 is fixedly connected with the twelfth rotational element N12 (the fourth ring gear R4) and fixedly connected with the input shaft IS, thereby always acting as an input element.

The second shaft TM2 is fixedly connected with the second rotational element N2 (the first planetary carrier PC1), the fifth rotational element N5 (the second planetary carrier PC2), and the eight rotational element (the third planetary carrier PC3), and fixedly connected with the output shaft OS, thereby always acting as an output element.

The third shaft TM3 is fixedly connected with the fourth rotational element N4 (the second sun gear S2).

The fourth shaft TM4 is fixedly connected with the seventh rotational element N7 (the third sun gear S3).

The fifth shaft TM5 is fixedly connected with the sixth rotational element N6 (the second ring gear R2) and the ninth rotational element N9 (the third ring gear R3).

The sixth shaft TM6 is fixedly connected with the tenth rotational element N11 (the fourth sun gear S4).

The seventh shaft TM7 is fixedly connected with the first rotational element N1 (the first sun gear S1) and the eleventh rotational element N11 (the fourth planetary carrier PC4), and selectively connected with the transmission housing H, thereby acting a selective fixed element.

The eighth shaft TM8 is fixedly connected with the third rotational element N3 (the first ring gear R1), and selectively connected with the transmission housing H, thereby acting as a selective fixed element.

Each of the eighth shafts TM1 to TM8 may be a rotational member that delivers torque and rotates with rotational element which fixedly or selectively interconnects a plurality of the rotational elements of the rotational elements of the planetary gear sets PG1, PG2, PG3, and PG4, and the eight shafts TM1 to TM8 may be a rotational member selectively connecting the rotational element with the transmission housing H, or be a fixed member directly connecting and fixing the rotational element with the transmission housing H.

In the disclosure, in the above description, the term "fixedly connected" or similar term means that a plurality of rotational elements including the input and output shafts, which are connected through the corresponding shafts, and the corresponding shaft are connected so as to rotate without any difference in the number of revolutions. That is, a plurality of fixedly connected rotational elements and corresponding shafts rotate in the same rotation direction and number of revolutions.

In addition, in the above description, the term "selectively connected" or similar terms means that a plurality of shafts, including an input and output shafts, are connected to each other so as to be rotatable in the same rotation direction and number of revolutions through engagement elements, or the corresponding shaft is fixedly connected to the transmission housing via the engagement element.

That is, when the engagement element operates to selectively connect a plurality of the shafts, the plurality of the shafts rotate in the same rotation direction and number of revolutions. Conversely, when the engagement element is released, the connection of the plurality of the shafts is released.

Further, when the engagement element operates to selectively connect the corresponding shaft and the transmission housing, the corresponding shaft is fixedly connected to the transmission housing. Conversely, when the engagement element is released, the corresponding shaft is in a rotatable state.

Here, the first shaft TM1 is selectively connected with the fifth shaft TM5, the fourth shaft TM4 is selectively connected with the sixth shaft TM6 and the seventh shaft TM7, respectively, and the third shaft TM3 is selectively connected with the sixth shaft TM6.

Further, the seventh shaft TM7 and the eighth shaft TM8 are selectively connected with the transmission housing H respectively to act as a selective fixed element.

Further, the output gear OG is disposed in front of the first planetary gear set.

The eight shafts TM1 to TM8 may be selectively interconnected with one another by control elements of four clutches C1 to C4.

Further, the eight shafts TM1 to TM8 may be selectively connected with the transmission housing H, by control elements of two brakes B1 and B2.

The four clutches C1 to C4 and the two brakes B1 and B2 are arranged as follows.

The first clutch C1 is arranged between the first shaft TM1 and the fifth shaft TM5, and selectively connects the first shaft TM1 and the fifth shaft TM5, thereby controlling power delivery therebetween.

The second clutch C2 is arranged between the fourth shaft TM4 and the seventh shaft TM7, and selectively connects the fourth shaft TM4 and the seventh shaft TM7, thereby controlling power delivery therebetween.

The third clutch C3 is arranged between the fourth shaft TM4 and the sixth shaft TM6, and selectively connects the fourth shaft TM4 and the sixth shaft TM6, thereby controlling power delivery therebetween.

The fourth clutch C4 is arranged between the third shaft TM3 and the sixth shaft TM6, and selectively connects the third shaft TM3 and the sixth shaft TM6, thereby controlling power delivery therebetween.

The first brake B1 is arranged between the seventh shaft TM7 and the transmission housing H, and selectively connects the seventh shaft TM7 to the transmission housing H.

The second brake B2 is arranged between the eighth shaft TM8 and the transmission housing H, and selectively connects the eighth shaft TM8 to the transmission housing H.

The engagement elements of the first, second, third, and fourth clutches C1, C2, C3, and C4 and the first and second brakes B1 and B2 may be realized as multi-plate hydraulic pressure friction devices that are frictionally engaged by hydraulic pressure, however, it should not be understood to be limited thereto, since various other configuration that are electrically controllable may be available.

FIG. 2 is an operational chart for respective control elements at respective shift stages in a planetary gear train according to a first exemplary embodiment of the present invention.

Referring to FIG. 2, a planetary gear train according to an exemplary embodiment of the present invention realizes nine forward speeds and at least one reverse speed by operating three engagements among the first, second, and third clutches C1, C2, C3 and C4 and first and second brake B1 and B2.

In the forward first speed shift-stage D1, the first and fourth clutches C1 and C4 and the second brake B2 are simultaneously operated.

As a result, the first shaft TM1 is fixedly connected with the fifth shaft TM5 by the operation of the first clutch C1, and the third shaft TM3 is fixedly connected with the sixth shaft TM6 by the operation of the fourth clutch C4. In this state, torque of the Input shaft IS is input to the first shaft TM1.

In addition, the eighth shaft TM8 acts as a fixed element by the operation of the second brake B2, thereby realizing the forward first speed and outputting a shifted torque to the output shaft OS connected with the second shaft TM2.

In the forward second speed shift-stage D2, the second and fourth clutches C2 and C4 and the second brake B2 are simultaneously operated.

As a result, the fourth shaft TM4 is fixedly connected with the seventh shaft TM7 by the operation of the second clutch C2, and the third shaft TM3 is fixedly connected with the sixth shaft TM6 by the operation of the fourth clutch C4. In this state, torque of the Input shaft IS is input to the first shaft TM1.

In addition, the eighth shaft TM8 acts as a fixed element by the operation of the second brake B2, thereby realizing the forward second speed and outputting a shifted torque to the output shaft OS connected with the second shaft TM2.

In the forward third speed shift-stage D3, the third and fourth clutches C3 and C4 and the second brake B2 are simultaneously operated.

As a result, the fourth shaft TM4 is fixedly connected with the sixth shaft TM6 by the operation of the third clutch C3, and the third shaft TM3 is fixedly connected with the sixth shaft TM6 by the operation of the fourth clutch C4. In this state, torque of the Input shaft IS is input to the first shaft TM1.

In addition, the eighth shaft TM8 acts as a fixed element by the operation of the second brake B2, thereby realizing the forward third speed and outputting a shifted torque to the output shaft OS connected with the second shaft TM2.

In the forward fourth speed shift-stage D4, the second and third clutches C1 and C3 and the second brake B2 are simultaneously operated.

As a result, the fourth shaft TM4 is fixedly connected with the seventh shaft TM7 by the operation of the second clutch C2, and the fourth shaft TM4 is fixedly connected with the sixth shaft TM6 by the operation of the third clutch C3. In this state, torque of the Input shaft IS is input to the first shaft TM1.

In addition, the eighth shaft TM8 acts as a fixed element by the operation of the second brake B2, thereby realizing the forward fourth speed and outputting a shifted torque to the output shaft OS connected with the second shaft TM2.

In the forward fifth speed shift-stage D5, the first and third clutches C1 and C3 and the second brake B2 are simultaneously operated.

As a result, the first shaft TM1 is fixedly connected with the fifth shaft TM5 by the operation of the first clutch C1, and the fourth shaft TM4 is fixedly connected with the sixth shaft TM6 by the operation of the third clutch C3. In this state, torque of the Input shaft IS is input to the first shaft TM1.

In addition, the eighth shaft TM8 acts as a fixed element by the operation of the second brake B2, thereby realizing the forward fifth speed and outputting a shifted torque to the output shaft OS connected with the second shaft TM2.

In the forward sixth speed shift-stage D6, the first and second clutches C1 and C2 and the second brake B2 are simultaneously operated.

As a result, the first shaft TM1 is fixedly connected with the fifth shaft TM5 by the operation of the first clutch C1, and the fourth shaft TM4 is fixedly connected with the seventh shaft TM7 by the operation of the second clutch C2. In this state, torque of the Input shaft IS is input to the first shaft TM1.

In addition, the eighth shaft TM8 acts as a fixed element by the operation of the second brake B2, thereby realizing the forward sixth speed and outputting a shifted torque to the output shaft OS connected with the second shaft TM2.

In the forward first speed shift-stage D1, the first, second, and third clutches C1 to C3 are simultaneously operated.

As a result, the first shaft TM1 is fixedly connected with the fifth shaft TM5 by the operation of the first clutch C1, and the fourth shaft TM4 is fixedly connected with the seventh shaft TM7 by the operation of the second clutch C2, and the fourth shaft TM4 is fixedly connected with the sixth shaft TM6 by the operation of the third clutch C3. In this state, torque of the Input shaft IS is input to the first shaft TM1.

Then, the first, second, third, and fourth planetary gear sets PG1, PG2, PG3, and PG4 integrally rotate, and the torque received at the first shaft TM1 is outputted as inputted, thereby realizing the forward seventh speed and outputting a shifted torque through the output shaft OS connected with the second shaft TM2.

In the forward eighth speed shift-stage D8, the first and second clutches C1 and C2 and the first brake B1 are simultaneously operated.

As a result, the first shaft TM1 is fixedly connected with the fifth shaft TM5 by the operation of the first clutch C1, and the fourth shaft TM4 is fixedly connected with the seventh shaft TM7 by the operation of the second clutch C2. In this state, torque of the Input shaft IS is input to the first shaft TM1.

In addition, the seventh shaft TM7 acts as a fixed element by the operation of the first brake B1, thereby realizing the forward eight speed and outputting a shifted torque to the output shaft OS connected with the second shaft TM2.

In the forward ninth speed shift-stage D9, the first and third clutches C1 and C3 and the first brake B1 are simultaneously operated.

As a result, the first shaft TM1 is fixedly connected with the fifth shaft TM5 by the operation of the first clutch C1, and the fourth shaft TM4 is fixedly connected with the sixth shaft TM6 by the operation of the third clutch C3. In this state, torque of the Input shaft IS is input to the first shaft TM1.

In addition, the seventh shaft TM7 acts as a fixed element by the operation of the first brake B1, thereby realizing the forward ninth speed and outputting a shifted torque to the output shaft OS connected with the second shaft TM2.

In the reverse speed REV, the first and fourth clutches C1 and C4, and the first brake B1 are simultaneously operated.

As a result, the first shaft TM2 is fixedly connected with the fifth shaft TM5 by the operation of the first clutch C1, and the third shaft TM3 is fixedly connected with the sixth shaft TM6 by the operation of the fourth clutch C4. In this state, torque of the Input shaft IS is input to the first shaft TM1.

In addition, the first shaft TM1 acts as a fixed element by the operation of the first brake B1, thereby realizing the reverse speed and outputting a shifted torque to the output shaft OS connected with the second shaft TM2.

Figure 3:
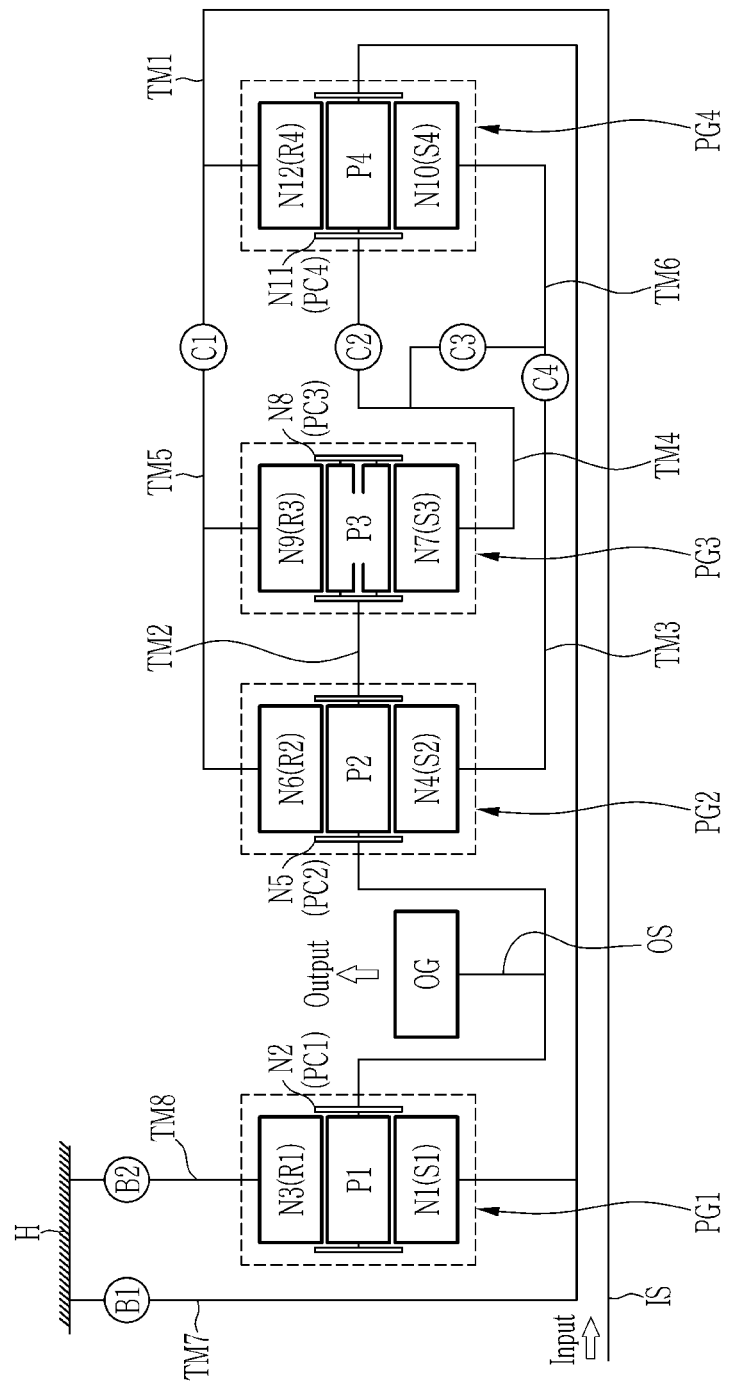
FIG. 3 is a schematic diagram of a planetary gear train according to a second exemplary embodiment of the present invention.

FIG. 3 is a schematic diagram of a planetary gear train according to a second exemplary embodiment of the present invention.

Referring to FIG. 3, in a planetary gear train according to a second exemplary embodiment of the present invention, connection relation of all rotational elements is same with that of the planetary gear train according to a first exemplary embodiment of the present invention, however, there is a difference that the output gear OG is disposed between the first planetary gear set PG1 and the second planetary gear set PG2 in the second exemplary embodiment of the present invention Thus, the first and second exemplary embodiments only differ in locations of the output gear OG, and other arrangements and shifting operations are the same. Therefore, specific description is omitted.

Figure 4:
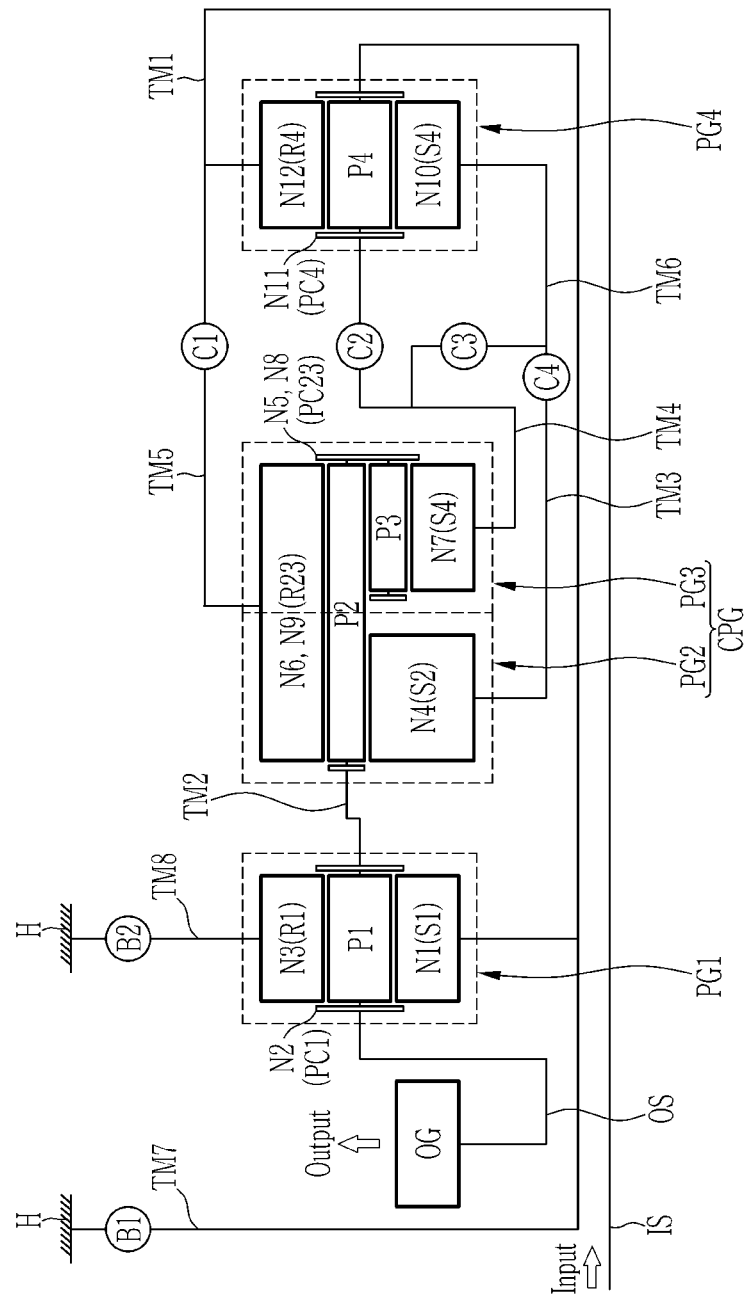
FIG. 4 is a schematic diagram of a planetary gear train according to a third exemplary embodiment of the present invention.

FIG. 4 is a schematic diagram of a planetary gear train according to a third exemplary embodiment of the present invention.

Referring to FIG. 4, in a planetary gear train according to a third exemplary embodiment of the present invention, a second planetary gear set PG2 which is a single pinion gear set and a third planetary gear set PG3 which is a double pinion gear set in the planetary gear train according to a first exemplary embodiment of the present invention are combined to be one compound planetary gear set CPG.

The compound planetary gear set CPG is a Ravingneaux type which shares the ring gear and the planetary carrier, and the fourth rotational element N4 is a second sun gear S2, the fifth and eighth rotational elements N5 and N8 are sharing carriers PC23, the sixth and ninth rotational elements N6 and N9 are sharing ring gears R23, and the seventh rotational element N7 is a fourth sun gear S4.

Thus, the first and third exemplary embodiments only differ in that the second and third planetary gear sets PG2 and PG3 are combined to be the compound planetary gear set CPG, and other arrangements and shifting operations are the same. Therefore, specific description is omitted.

Figure 5:
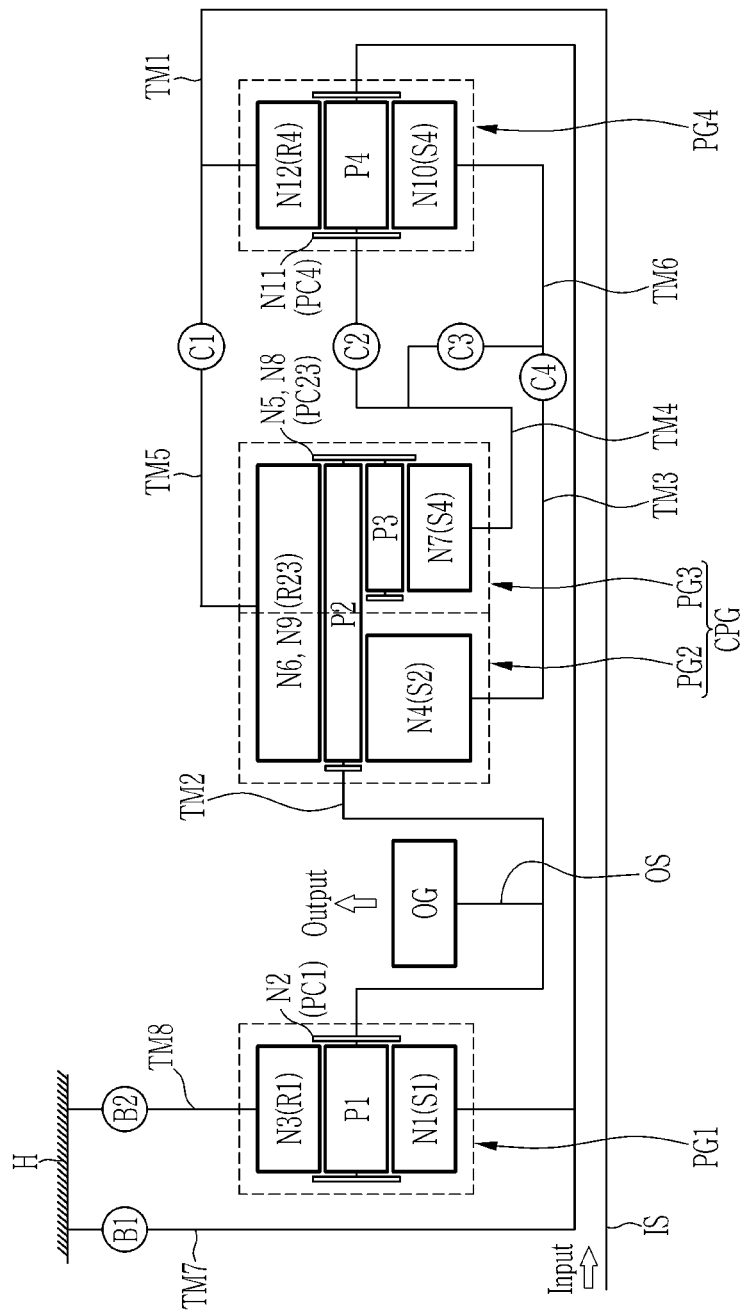
FIG. 5 is a schematic diagram of a planetary gear train according to a fourth exemplary embodiment of the present invention.

FIG. 5 is a schematic diagram of a planetary gear train according to a fourth exemplary embodiment of the present invention.

Referring to FIG. 5, in a planetary gear train according to a fourth exemplary embodiment of the present invention, a second planetary gear set PG2 which is a single pinion gear set and a third planetary gear set PG3 which is a double pinion gear set in the planetary gear train according to a second exemplary embodiment of the present invention are combined to be one compound planetary gear set CPG.

The compound planetary gear set CPG is a Ravingneaux type which shares the ring gear and the planetary carrier, and the fourth rotational element N4 is a second sun gear S2, the fifth and eighth rotational elements N5 and N8 are sharing carriers PC23, the sixth and ninth rotational elements N6 and N9 are sharing ring gears R23, and the seventh rotational element N7 is a fourth sun gear S4.

Thus, the second and fourth exemplary embodiments only differ in that the second and third planetary gear sets PG2 and PG3 are combined to be the compound planetary gear set CPG, and other arrangements and shifting operations are the same. Therefore, specific description is omitted.

As described above, a planetary gear train according to an exemplary embodiment of the present invention may realize forward nine speeds and a reverse one speed formed by operating four planetary gear sets PG1, PG2, PG3, and PG4 by controlling the four clutches C1, C2, C3, and C4 and the two brakes B1 and B2.

In addition, a planetary gear train according to an exemplary embodiment of the present invention may realize shift stages appropriate for rotation speed of an engine due to multi-stages of an automatic transmission and improve driving stability of a vehicle by utilizing a low rotation speed of an engine.

In addition, a planetary gear train according to an exemplary embodiment of the present invention may maximize engine driving efficiency by multi-stages of an automatic transmission, and may improve power delivery performance and fuel consumption.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, the planetary gear train comprising:
   an input shaft configured to receive an engine torque;
   an output shaft configured to deliver a torque to an output gear;
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   a first shaft fixedly connected with the twelfth rotational element and fixedly connected with the input shaft;
   a second shaft fixedly connected with the fifth rotational element and the eighth rotational element, and fixedly connected with the output shaft;
   a third shaft fixedly connected with the fourth rotational element;
   a fourth shaft fixedly connected with the seventh rotational element;
   a fifth shaft fixedly connected with the sixth rotational element and the ninth rotational element;
   a sixth shaft fixedly connected with the tenth rotational element; and
   a plurality of additional shafts, each additional shaft being selectively connected to a transmission housing and fixedly connected to a rotation element of the first and fourth planetary gear sets that is not fixedly connected with any of the first to sixth shafts.

2. The planetary gear train of claim 1, wherein the plurality of additional shafts comprise:
   a seventh shaft fixedly connected with the first rotational element and the eleventh rotational element, and selectively connected with the transmission housing; and
   an eighth shaft fixedly connected with the third rotational element, and selectively connected with the transmission housing.

3. The planetary gear train of claim 2, wherein the first shaft is selectively connected with the fifth shaft, the fourth shaft is selectively connected with the seventh shaft, the fourth shaft is selectively connected with the sixth shaft, and the third shaft is selectively connected with the sixth shaft.

4. The planetary gear train of claim 3, further comprising:
four clutches selectively connecting two shafts among the first to the eighth shaft;
a first brake selectively connecting the seventh shaft to the transmission housing; and
a second brake selectively connecting the eighth shaft to the transmission housing.

5. The planetary gear train of claim 2, further comprising:
a first clutch disposed between the first shaft and the fifth shaft;
a second clutch disposed between the fourth shaft and the seventh shaft;
a third clutch disposed between the fourth shaft and the sixth shaft;
a fourth clutch disposed between the third shaft and the sixth shaft;
a first brake disposed between the seventh shaft and the transmission housing; and
a second brake disposed between the eighth shaft and the transmission housing.

6. The planetary gear train of claim 5, wherein:
the first shaft is selectively connected with the fifth shaft;
the fourth shaft is selectively connected with the seventh shaft;
the fourth shaft is selectively connected with the sixth shaft; and
the third shaft is selectively connected with the sixth shaft.

7. The planetary gear train of claim 1, wherein:
the first planetary gear set is a single pinion planetary gear set, and the first, second, and third rotational elements are respectively a first sun gear, a first planetary carrier, and a first ring gear,
the second planetary gear set is a single pinion planetary gear set, and the fourth, fifth, and sixth rotational elements are respectively a second sun gear, a second planetary carrier, and a second ring gear,
the third planetary gear set is a single pinion planetary gear set, and the seventh, eighth, and ninth rotational elements are respectively a third sun gear, a third planetary carrier, and a third ring gear, and
the fourth planetary gear set is a single pinion planetary gear set, and the tenth, eleventh, and twelfth rotational elements are respectively a fourth sun gear, a fourth planetary carrier, and a fourth ring gear.

8. The planetary gear train of claim 7, wherein the second and third planetary gear sets are compound planetary gear sets which the fourth rotational element is the second sun gear, the fifth and the eighth rotational elements are sharing planetary carriers, the sixth and ninth rotational elements are sharing ring gears, the seventh rotational element is the third sun gear.

9. The planetary gear train of claim 1, wherein the output gear is disposed in front of the first planetary gear set.

10. The planetary gear train of claim 1, wherein the output gear is disposed between the first planetary gear set and the second planetary gear set.

11. A planetary gear train of an automatic transmission for a vehicle, comprising:
an input shaft configured to receive an engine torque;
an output shaft configured to deliver a torque to an output gear;
a first planetary gear set having first, second, and third rotational elements;
a second planetary gear set having fourth, fifth, and sixth rotational elements;
a third planetary gear set having seventh, eighth, and ninth rotational elements; and
a fourth planetary gear set having tenth, eleventh, and twelfth rotational elements,
wherein the first rotational element is fixedly connected with the eleventh rotational element, and selectively connected with a transmission housing,
wherein the second rotational element is fixedly connected with the fifth rotational element and the eight rotational element, and fixedly connected with the output shaft,
wherein the third rotational element is selectively connected with the transmission housing,
wherein the fourth rotational element is selectively connected with the tenth rotational element,
wherein the sixth rotational element is fixedly connected with the ninth rotational element,
the seventh rotational element is selectively connected with the tenth rotational element and the eleventh rotational element, respectively,
the twelfth rotational element is selectively connected with the ninth rotational element.

12. The planetary gear train of claim 11, further comprising:
four clutches selectively connecting rotational elements with each other; and
two brakes selectively connecting the first rotational element and the third rotational element to the transmission housing, respectively.

13. The planetary gear train of claim 12, wherein the four clutches comprise:
a first clutch disposed between the ninth rotational element and the twelfth rotational element;
a second clutch disposed between the seventh rotational element and the eleventh rotational element;
a third clutch disposed between the seventh rotational element and the tenth rotational element; and
a fourth clutch disposed between the fourth rotational element and the tenth rotational element; and
wherein the two brakes comprise:
a first brake disposed between the first rotational element and the transmission housing; and
a second brake disposed between the third rotational element and the transmission housing.

14. The planetary gear train of claim 11, wherein:
the first planetary gear set is a single pinion planetary gear set, and the first, second, and third rotational elements are respectively a first sun gear, a first planetary carrier, and a first ring gear;
the second planetary gear set is a single pinion planetary gear set, and the fourth, fifth, and sixth rotational elements are respectively a second sun gear, a second planetary carrier, and a second ring gear;
the third planetary gear set is a single pinion planetary gear set, and the seventh, eighth, and ninth rotational elements are respectively a third sun gear, a third planetary carrier, and a third ring gear; and
the fourth planetary gear set is a single pinion planetary gear set, and the tenth, eleventh, and twelfth rotational elements are respectively a fourth sun gear, a fourth planetary carrier, and a fourth ring gear.

15. The planetary gear train of claim 14, wherein the second and third planetary gear set are compound planetary gear sets which the fourth rotational element is the second sun gear, the fifth and the eighth rotational elements are sharing planetary carriers, the sixth and ninth rotational elements are sharing ring gears, the seventh rotational element is the third sun gear.

16. The planetary gear train of claim 11, wherein the output gear is disposed in front of the first planetary gear set.

17. The planetary gear train of claim 11, wherein the output gear is disposed between the first planetary gear set and the second planetary gear set.

18. A planetary gear train of an automatic transmission for a vehicle, the planetary gear train comprising:
- a transmission housing;
- an input shaft;
- an output shaft;
- a first planetary gear set having first, second, and third rotational elements, wherein the first planetary gear set is a single pinion planetary gear set, and the first, second, and third rotational elements are respectively a first sun gear, a first planetary carrier, and a first ring gear;
- a second planetary gear set having fourth, fifth, and sixth rotational elements, wherein the second planetary gear set is a single pinion planetary gear set, and the fourth, fifth, and sixth rotational elements are respectively a second sun gear, a second planetary carrier, and a second ring gear;
- a third planetary gear set having seventh, eighth, and ninth rotational elements, wherein the third planetary gear set is a single pinion planetary gear set, and the seventh, eighth, and ninth rotational elements are respectively a third sun gear, a third planetary carrier, and a third ring gear;
- a fourth planetary gear set having tenth, eleventh, and twelfth rotational elements, wherein the fourth planetary gear set is a single pinion planetary gear set, and the tenth, eleventh, and twelfth rotational elements are respectively a fourth sun gear, a fourth planetary carrier, and a fourth ring gear;
- a first shaft fixedly connected with the twelfth rotational element and fixedly connected with the input shaft;
- a second shaft fixedly connected with the fifth rotational element and the eighth rotational element, and fixedly connected with the output shaft;
- a third shaft fixedly connected with the fourth rotational element;
- a fourth shaft fixedly connected with the seventh rotational element;
- a fifth shaft fixedly connected with the sixth rotational element and the ninth rotational element, wherein the first shaft is selectively connected with the fifth shaft;
- a sixth shaft fixedly connected with the tenth rotational element, wherein the fourth shaft is selectively connected with the sixth shaft and the third shaft is selectively connected with the sixth shaft;
- a seventh shaft fixedly connected with the first rotational element and the eleventh rotational element, and selectively connected with the transmission housing, wherein the fourth shaft is selectively connected with the seventh shaft; and
- an eighth shaft fixedly connected with the third rotational element, and selectively connected with the transmission housing.

19. The planetary gear train of claim 18, further comprising:
- a first clutch disposed between the first shaft and the fifth shaft;
- a second clutch disposed between the fourth shaft and the seventh shaft;
- a third clutch disposed between the fourth shaft and the sixth shaft;
- a fourth clutch disposed between the third shaft and the sixth shaft;
- a first brake disposed between the seventh shaft and the transmission housing; and
- a second brake disposed between the eighth shaft and the transmission housing.

20. The planetary gear train of claim 18, wherein the second and third planetary gear set are compound planetary gear sets which the fourth rotational element is the second sun gear, the fifth and the eighth rotational elements are sharing planetary carriers, the sixth and ninth rotational elements are sharing ring gears, the seventh rotational element is the third sun gear.

* * * * *